United States Patent [19]

Viswanathan et al.

[11] Patent Number: 4,692,478

[45] Date of Patent: Sep. 8, 1987

[54] PROCESS FOR PREPARATION OF RESIN AND RESIN OBTAINED

[75] Inventors: Tito Viswanathan, Little Rock, Ark.; Donald H. Westermann, Greenfield, Wis.

[73] Assignee: Chemical Process Corporation, Greenfield, Wis.

[21] Appl. No.: 839,513

[22] Filed: Mar. 14, 1986

[51] Int. Cl.$^4$ .......................... C08L 3/02; C08L 5/00; C08L 5/02

[52] U.S. Cl. ..................................... 527/300; 524/13; 524/14; 524/15; 524/27; 524/35; 524/47; 524/48; 524/54; 524/55; 524/58; 536/126

[58] Field of Search ................. 527/300, 312; 524/13, 524/14, 15, 27, 35, 47, 48, 54, 55, 58; 536/126

[56] References Cited

U.S. PATENT DOCUMENTS

| | | | |
|---|---|---|---|
| 1,801,053 | 4/1931 | Meigs | 524/58 |
| 2,001,430 | 5/1935 | Meigs | 527/303 |
| 4,048,126 | 9/1977 | Gibbons et al. | 527/303 |
| 4,085,075 | 4/1978 | Gibbons et al. | 524/47 |
| 4,085,076 | 4/1978 | Gibbons et al. | 527/303 |
| 4,107,379 | 8/1978 | Stofko | 428/326 |
| 4,183,997 | 1/1980 | Stofko | 428/326 |
| 4,357,194 | 11/1982 | Stofko | 156/308.6 |
| 4,524,164 | 6/1985 | Viswanathan et al. | 524/14 |

Primary Examiner—John Kight
Assistant Examiner—Nathan M. Nutter
Attorney, Agent, or Firm—Quarles and Brady

[57] ABSTRACT

The process of preparing a formaldehyde-free, thermosetting resin which is especially useful for bonding lignocellulosic materials together to form plywood or particle board, which process comprises first reacting an aqueous preparation containing a carbohydrate raw material with a mineral acid to convert the carbohydrate to polymerizable reactants and second reacting the polymerizable reactants with ammonia to form the thermosetting resin. The resin can be further crosslinked to form an insoluble resinous material by heating.

13 Claims, No Drawings

PROCESS FOR PREPARATION OF RESIN AND RESIN OBTAINED

This invention was made with government support under Contract No. 68-02-4043 awarded by the Environmental Protection Agency. The government has certain rights in this invention.

TECHNICAL FIELD

The present invention relates to a process for the production of a thermosetting resin for use in binding solid lignocellulosic materials to form products, such as particle board, and to the novel resin obtained.

BACKGROUND ART

Urea-formaldehyde and phenol-formaldehyde condensation resins are the major types of thermosetting resins currently used as adhesives for binding together solid lignocellulosic materials, including wood, to form useful products. The resins generally are provided as aqueous products containing high solid levels or as powders which may be dissolved in water or applied directly to the lignocellulosic particles prior to hot pressing to form particle board. Even though most of the formaldehyde employed in forming the resin reacts with the urea or the phenol and forms part of the polymeric adhesive resin, some free formaldehyde remains which can volatilize from the final product into the immediate environment. Liberation of formaldehyde from the end product may also result from the hydrolysis of the resin. Formaldehyde has been implicated as a carcinogen and its presence in the environment poses a potential public health problem. Therefore, it is desirable to have adhesives that do not either contain formaldehyde as an ingredient or which will release formaldehyde upon hydrolysis.

The basic raw materials used in most commercially available condensation resins are derived from petroleum and natural gas. Since the prices of these non-renewable resource materials have increased, attempts have been made to replace them with less expensive materials. For example, carbohydrates, such as sugars and starches, have been employed as ingredients in binders for solid lignocellulosic materials to produce water proof plywood and particle boards. The Stofko, U.S. Pat. Nos. 4,107,379; 4,183,997 and 4,357,194 describe the use of such carbohydrates.

The Stofko U.S. Pat. No. 4,107,379 describes the application of a mixture of a sugar solution and an inorganic acid onto the surfaces of the lignocellulosic material to be bonded, followed by heating and pressing until the carbohydrates are transformed into furan-type compounds which act as adhesives.

The Stofko U.S. Pat. No. 4,183,997, which is an extension of the above patent, teaches the further addition of an alkaline agent to prevent an excessive decline in the pH of the resulting adhesive which upon heating can result in hydrolytic degration of wood. The patent states that the sugars may be added directly to the surfaces of the lignocellulosic materials as powders or first mixed with a liquid carrier along with a catalyst to accelerate the transformation of the sugars into water insoluble products and applied as a liquid. When the sugars are added as powders, the process requires melting the mixture and spreading it while it is still hot. This can result not only in the evolution of toxic HCl gas, but also can cause clumping problems unless the lignocellulosic materials being bonded are kept at relatively high temperatures during the application of the hot melt. When a liquid is used as a carrier (water or ethanol) the solution containing the mixture of sugar(s) and catalyst is either applied directly to the materials to be bonded or it is preheated at a temperature from 100° C. to 130° C. for a period from 30 to 120 minutes prior to application.

The Stofko U.S. Pat. No. 4,357,194 describes adhesive compositions which contain, in addition to starches, phenolic containing materials, such as lignin, which are activated by contact with live steam.

The Gibbons et al. U.S. Pat. Nos. 4,085,075 and 4,085,076 describe methods for the manufacture of carbohyrate based thermoset resins. The former patent describes the addition of a carbohydrate and an aminoplast to a phenol-formaldehyde novolak resin for making solid molding compositions. The latter patent describes the reaction of an aldose saccharide (preferably a hexose) with a phenolic compound and urea to form a liquid fusible resin. The liquid resin is then mixed with formaldehyde and the pH raised to 8.0 or more to form a resol resin. Both of the above patents require the presence of formaldehyde in the resin compositions to bind the lignocellulosic particles. The formaldehyde is replaced in part by carbohydrate(s), but some formaldehyde is still employed.

In the Viswanathan et al. U.S. Pat. No. 4,524,164, a method is disclosed for binding solid lignocellulosic materials using an adhesive which is made from readily available carbohydrates and which does not contain formaldehyde. In the patent, the reactants including a carbohydrate source, preferably whey, an inorganic acid and a catalyst, are all added simultaneously to a batch reactor. The simultaneous addition of all the reactants precludes any advantage to be gained in resin quality and/or economy of production which might be derived by separating the desirable from the undesirable reactions through successive additions of reactants or by proper choice of optimum process parameters, i.e., temperature, pressure and concentrations.

The Viswanathan process and resin are valuable improvements in the field of making particle board, but it would be even more desirable to have a process in which the carbohydrate, which is used as the raw material, does not degrade to undesirable products and in which the resin obtained will cross-link without requiring the addition of polyfunctional cross-linking agents.

DISCLOSURE OF THE INVENTION

It is the primary object of this invention to disclose a superior process for the preparation from non-petroleum raw materials of a non-formaldehyde containing thermosetting resin which is both useful in the binding of materials and as a molding compound.

It is a further object to disclose a novel, water soluble, storage stable, formaldehyde-free thermosetting resin for use in binding lignocellulosic materials to prepare products, such as particle board.

The process of the present invention basically comprises two steps or phases.

In the first step, an aqueous solution of a carbohydrate containing material, preferably whey or whey permeate, is reacted with a mineral acid, such as sulfuric acid, hydrochloric acid or phosphoric acid, under very low pH conditions at a temperature from about 100° C. to about 225° C., to rapidly hydrolyze the polymers, oligomers or disaccharides in the carbohydrate containing material to simple sugars which are then converted to polymerizable reactants such as HMF and dimers and oligimers of HMF and related compounds.

In the second step, the reactive compounds, including the polymerizable monomers, are reacted with ammonia under less acidic conditions to cause them to react, polymerize and partially cross link to form a water soluble, storage stable, thermosetting resin which upon added heating will further cross link and set to an insoluble solid.

The exact mechanisms by which the thermosetting resins are formed are not known, however, it is known that carbohydrates are sensitive to extremely acidic or alkaline conditions. For example, the principal carbohydrate of whey, lactose, readily degrades when exposed to temperatures in excess of 100° C. into not only its hydrolysis products, glucose and galactose, but also hydroxymethylfurfural and other degradation products. In addition to the desirable hydroxymethylfurfural (HMF), Strecker degradation and other charred products are produced.

It is an object of the first step of the process of the present invention to control the degradation so that the undesirable degradation products are either not formed or only formed in small amounts. In the second step the desirable degradation products, the polymerizable monomers, are polymerized under less acidic conditions.

From the description which follows, it will be apparent to those skilled in the art that the process and resin of the present invention possess numerous advantages over prior known processes and resins.

DESCRIPTION OF THE PREFERRED EMBODIMENT

In the preferred embodiment of the invention, whey or whey permeate is the preferred carbohydrate source, however, practically any source of starch, dextrins and sugars may be used. The use of whey or whey permeate is preferred because, in addition, to providing an economical source of carbohydrates the use of whey or whey permeate alleviates a long standing environmental problem by using an abundant waste material to prepare a useful product. The use of whey or whey permeate is further preferred because it contains protein and other nitrogen containing products that appear to cooperate in providing a resin which is superior to those obtained from a pure carbohydrate source such as lactose.

In the preferred practice of the process, in the first step an aqueous preparation of whey permeate, containing from about 30% to about 95% solids in water, is heated in a reactor to about 140° to about 250° C. in about 10 to about 20 minutes in the presence of sufficient mineral acid, preferably sulfuric acid, to produce a pH of about 0.5 to about 2.0. Under these conditions the lactose in the whey is hydrolyzed to glucose and galactose which in turn are degraded to HMF and other polymerizable reactants. In the second step, at about 145° C., sufficient ammonia gas is introduced into the closed reactor to produce a final pH of about 3.0 to about 4.0 whereupon the polymerizable reactants are polymerized to the desired resin.

It is believed that the following major reactions take place in the formation of the resin:

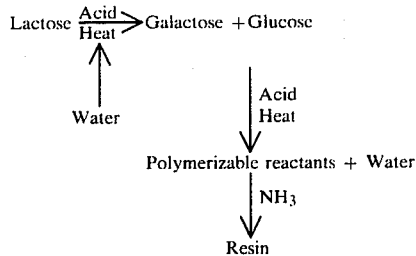

The preferred mineral acid is sulfuric acid, however, other mineral acids, including hydrochloric acid or phosphoric acid can also be used. The only mineral acid not recommended is nitric acid which is known to oxidize the aldehyde groups of sugar monomers to carboxylic acid groups.

Although liquid ammonia can be used, the use of gaseous ammonia is preferred to minimize the dilution of the reactants.

The dry whey permeate will usually contain about 80–90% lactose and small amounts of protein and other nitrogen containing compounds. It is commercially available from many sources.

The two step process can be operated in a continuous mode by using a compartmented reactor which simulates "plug flow" reactor conditions. In a compartmented reactor, the time for completing the major reactions which comprise the complete process can be, as little as, five to ten minutes.

EXPERIMENTAL PROCEDURES

In the examples which follow, the technique described to follow the progress of the reactions and to deduce the perceived mechanism of the successive reactions which occur, is based on the solubility of the reactants and products in a limited quantity of methanol. For all measurements of the methanol insoluble products (hereafter called M.I.P.), one (1) gram of the reactant or product solids was dispersed in one hundred milliliters of methanol. The solid was dispersed in the methanol and the suspension filtered. The insoluble residue was recovered, dried and weighed and duly recorded as % M.I.P. or the percentage of the original gram of solids. M.I.P. was plotted as a function over the course of the reaction.

Upon initial suspension of the whey solids in methanol the degree of M.I.P. was approximately 90%. This is consistent with the solubility of lactose in methanol under these conditions of limiting solvent volume as noted by a measurement of pure lactose solubility under these conditions. Upon addition of the sulfuric acid to establish a pH of 0.5 followed by heat up of the reactor a sample taken about one minute later produced an M.I.P. of 50 to 53%. This value of M.I.P. is consistent with the solubility of glucose and galactose in methanol as confirmed by measurements of the solubilities of pure compounds under this restricted solvent condition. These measurements, along with Infra Red Spectrophotometry, confirm the presence of the monosaccharides in the reaction mix after the first several minutes of batch reactor heatup.

In the next few minutes of the first step, the monosaccharides are dehydrated to hydroxymethylfurfural (HMF), dimers and oligimers of HMF and other dehydration products. At this stage, the M.I.P. drops to a level of about 20%. It is known that HMF is completely soluble in methanol. Therefore, a value of 20% insoluble solids indicated that most of the monosaccharides had been converted to highly methanol-soluble HMF and/or dimers of HMF, which was confirmed by I.R. (Infra Red) and N.M.R. (nuclear magnetic resonance) spectroscopy.

When the minimum amount of M.I.P. is produced the second step of the process is initiated by injecting ammonia gas into the stirred heated reactor or the appropriate compartment of a compartmented reactor. A very rapid polymerization takes place as evidenced by the rapid rise in the M.I.P. to a level of about 70% to about 85%. A measurement of the molecular weight of the polymer produced at this time shows that molecular weights in excess of about 5,000 are not soluble in methanol under the solvent restricted test conditions. Sufficient ammonia is preferably added to raise the pH to a level of 4.0 because evaluation of finished products shows that finished resin with a pH of about 4.0 possesses the optimum characteristic for particle board manufacture including high strength, water solubility of the uncured resin and water resistance of the cured resin.

The final phase, involving complete polymerization and cross linking of the resin, occurs as the result of heating in the preparation of the final product, e.g. particle board. By experimentally controlling the time dwell in the reactor, the degree of polymerization in the reactor, in contrast to the degree of cross linking in the press, can be controlled. In the batch reactor at 145° C. about 5 minutes is required for the final cross-linking. Consistent with the previous M.I.P. measurements the value of M.I.P. continued to increase as the polymerization and cross linking progressed. Indeed it is possible to cause the resin to solidify in the reactor if held 10 or more minutes under the described conditions.

To determine the conditions required for a proper continuous reactor production of the resin in two steps, comprising the previously described reactions, the batch data were analyzed to obtain kinetic constants. These constants then allowed establishing the desired continuous reaction parameters for resin production.

Analysis of the batch experimental data showed the following equation adequately described the first hydrolysis reaction:

Lactose→Galactose+Glucose 

The reaction was found to be first order with respect to both concentration of lactose and hydrogen ion concentration. An energy of activation of 85 KiloCalories per gram mole indicates a relatively high sensitivity to temperature. At 100° C. the reaction rate would double for a 3° C. rise in reaction temperature. Therefore, it is obvious that the initial hydrolysis of lactose can be accomplished very rapidly.

Calculations based on data gathered from batch reactions shows the energy of activation of the monosaccharide dehydration, the second reaction in the process, to be very low, i.e., about 10 kcal. gm. mole. The reaction is first order with respect to concentration at a pH of 0.5 and first order with respect to hydrogen ion concentration at the pH range around 0.5 to 1.0. The fact that the anticipated dehydration occurs in this second reaction is confirmed by calculations that show the availability of 76% of the three molecules of water from the cyclization reaction to HMF when allowing for one molecule of water per mole to be added to lactose upon hydrolysis to glucose and galactose. The calculation is based on the decrease in solids content or conversely the increased water content which occurs during the course of the entire reaction.

The third reaction in the process, the polymerization of the dehydrated monomers, HMF and its derivatives, with gaseous ammonia is very rapid, i.e., less than one minute at 145° C. The M.I.P. increases by 50 to 70%. The ammonia reacts with the reactive intermediates and raises the pH. The rate of reaction is so fast that successive samples could not be taken from a batch reactor for subsequent evaluation.

After the M.I.P. has risen very rapidly due to the introduction of the gaseous ammonia the insolubility in methanol continues to rise as the result of the cross-linking taking place. If heating is continued within approximately the next ten minutes after the M.I.P. has increased to 50 to 70% the M.I.P. increases to 80–85% and, the resin solidifies completely. Therefore, the continued polymerization and cross linking required in making particle board in the board press can be controlled by the time the resin is held in the reactor during this last stage.

The practice of the invention is further illustrated by the following examples.

EXAMPLE 1

233 grams of dried whey permeate was added to a 500 ml high pressure Parr heated reactor containing 90.0 grams of fresh water to form a suspension of 72% solids. Next 9.7 ml. of 95% sulfuric acid was added. The pH of the reaction mix was 0.5. The reactor was sealed and the contents were vigorously stirred with a flat bladed turbine agitator. It took about 15 minutes for the contents to rise to the control temperature of 145° C. After 20 minutes, 3.04 gram of gaseous ammonia was introduced into the reactor under pressure. The pH was then about 4.0. The contents of the reactor were held at 145° C. for an additional 10 minutes. The profiles of the M.I.P. of the reactor contents and the pH of the contents were measured by withdrawing small aliquots during the course of reaction. Performance of the resin in finished particle board is shown in Table 1.

TABLE 1

| Resin | Press Temperature °C. | Press Time | Density of Board Lb/Ft | Internal Bond Strength, p.s.i. | % Swelling in water (25 hr.) | Dry Strength p.s.i. |
|---|---|---|---|---|---|---|
| Example 1. (7%) | 180 | 5 min | 62 | 89 | 20.0 | 15 |
| Example 1. (10%) | 180 | 5 | 55 | 109 | 20.0 | 30 |
| Example 2 7% | 180 | 6 min. | 55 | 45 | | — |
| Example 3 7% | 180 | 6 min. | 51 | 35 | | — |
| Example 4 7% | 180 | 6 min. | 61 | 102 | | — |

TABLE 1-continued

| Resin | Press Temperature °C. | Press Time | Density of Board Lb/Ft | Internal Bond Strength, p.s.i. | % Swelling in water (25 hr.) | Dry Strength p.s.i. |
| --- | --- | --- | --- | --- | --- | --- |
| Example 5. 7% | 180 | 6 min. | 60 | 106 | | — |
| For Comparative Purposes (Commercial Resins) CASCO(WW-101-R) Urea-Formaldehyde Borden Chemical Co. | | | | | | |
| 7% resin in board | 11165° | 7 min. | 64 | 92 | 41 | — |
| 10% resin in board | 165° | 7 min. | 61 | 123 | 13 | 20 |
| Plenco-650, Phenol - Formaldehyde Plastics Engineering Co., Sheboygan, Wisconsin | | | | | | |
| % resin in board | 165 | 7 min. | 62 | 78 | 13 | 32 |
| 10% resin in board | 165 | 7 min. | 62 | 109 | 7 | 49 |

Note:
— indicates that the product had deteriorated to the extent that it was impossible to measure the strength.

EXAMPLE 2

233 gram of "Staleydex 95" (trademark of A. E. Staley Co., Decatur, Ill.) a commercial dextrin was introduced into a 500 ml Parr reactor containing 90.3 ml. of water and 9.7 ml. of 95% sulfuric acid. The pH of the contents of the reaction mix was 0.5. The reactor was sealed and the contents were stirred as described in example 1 while simultaneously heating to 145° C. The generation of M.I.P. was measured as described. 3.04 grams of gaseous ammonia was introduced at 17 minutes reaction time to increase the pH of the contents to 4.0. The reaction was continued for an additional 5 minutes. Particle board made with the resin is described in Table 1.

EXAMPLE 3

233 gram of pure food corn starch was introduced into a 500 ml Parr reactor containing 9.7 ml of 95% sulfuric acid and 90.3 ml of water. The pH of the reaction mix was 0.5. The reactor was sealed and the contents heated to 145° C. while simultaneously stirring. After 17 minutes 3.04 grams of gaseous ammonia was introduced under pressure to bring the pH up to 4.0. The contents were then heated an additional 5 minutes. The generation of M.I.P. was measured as described. Properties of particle board made from the resin are shown in Table 1.

EXAMPLE 4

116.5 grams of "Staleydex 95" and 116.5 grams of whey permeate were introduced into a 500 ml reactor which contained 9.7 ml of sulfuric acid and 90.3 ml of water. The pH of the reaction mix was 0.5. The reactor was sealed and heated to 145° C. while simultaneously stirring. After 17 minutes 3.04 grams of gaseous ammonia was introduced to bring the pH up to 4.0. The reaction mixture was heated for an additional 5 minutes. Properties of particle board made with resin are shown in Table 1.

EXAMPLE 5

Carbohydrate consisting of 116.5 grams of corn starch and 116.5 grams of whey permeate were reacted with sulfuric acid, water, whey and ammonia as described in Example 4. The properties of particle board made with the resin are shown in Table 1.

EXAMPLE 6

Resin was produced as cited in example 1 except the time the contents were held in the reactor at the end of the reaction was varied from 0 to 8 minutes. It was found that holding the resin in the reactor up to 5 minutes increased the desirable properties of particle board made with the resin but that holding the resin longer had a detrimental effect on the finished products.

EXAMPLE 7

233 grams of whey permeate was added to a 500 ml high pressure Parr reactor containing 90 grams of fresh water. The pH of the contents was adjusted to 0.5 by the addition of concentrated hydrochloric acid. The reactor was sealed and while the contents was stirred, it was heated to 145° C. When the methanol insoluble reactants of the mix reached a minimum of 22%, 21 minutes after starting the reaction, gaseous ammonia was added to raise the pH to 4.0. The results obtained were comparable to those obtained with the resin of Example 1.

EXAMPLE 8

The process of Example 7 was repeated except that phosphoric acid was used instead of hydrochloric acid. The results were comparable to those obtained with the resin of Example 1.

It will be readily apparent to those skilled in the art that the foregoing description has been for purposes of illustration only and that a number of changes and modifications may be made without departing from the spirit and scope of the present invention. Therefore, it is intended that the invention not be limited except by the claims which follow.

We claim:

1. The process for preparing a thermosetting resin for bonding lignocellulosic materials to form a product, such as plywood and particle board, which process comprises first reacting an aqueous preparation consisting essentially of carbohydrate in a closed reactor at an elevated temperature of about 140° C. to about 250° C. with sufficient mineral acid, to produce a pH of about 0.5 to 2.0, and to convert the carbohydrate to polymerizable reactants, and then when that reaction is over reacting the thus obtained reactants with ammonia at a pH above 3.0 to form a storage stable, water soluble, thermosetting resin which can be further cross-linked by exposure to heat.

2. The process in claim 1 in which the carbohydrate is whey permeate.

3. The process of claim 1 in which the aqueous preparation contains about 30 to about 95 percent solids by weight of carbohydrate.

4. The process of claim 1 in which the mineral acid employed is sulfuric acid.

5. The process of claim 1 in which sufficient mineral acid is employed to adjust the pH to about 0.5.

6. The process of claim 1 in which sufficient ammonia is employed to adjust the pH of the reaction mixture to about 2.0 to about 5.0.

7. A thermosetting resin prepared by the process of claim 1.

8. A two step process for preparing a formaldehyde-free adhesive from a carbohydrate raw material, said process comprising first heating in a closed reactor an aqueous preparation consisting essentially of hydrolyzable carbohydrate raw material to a temperature above about 100° C. in the presence of sufficient mineral acid to adjust the pH to about 0.5 to about 2.0 and to hydrolyze the carbohydrate to polymerizable reactants and when that reaction is substantially complete then reacting the polymerizable reactants with ammonia at a pH of above about 3.0 at a temperature of about 145° C. under pressure to form a resin which is storage stable and can be further cross-linked by the use of heat.

9. The process of claim 8 in which the carbohydrate raw material is whey permeate.

10. The process of claim 8 in which the mineral acid is sulfuric acid.

11. The process of claim 8 in which the reaction is conducted at a temperature of from about 100° to about 225° C.

12. The process of claim 8 in which the ammonia is gaseous ammonia.

13. A thermosetting resin when prepared by the process of claim 8.

* * * * *